(12) United States Patent
Brown et al.

(10) Patent No.: US 6,618,158 B1
(45) Date of Patent: Sep. 9, 2003

(54) METHOD AND DEVICE FOR CALIBRATING AN IMAGING APPARATUS HAVING MULTIPLE IMAGING OUTPUTS

(75) Inventors: David E. Brown, Saint Paul, MN (US); William A. Tolbert, Woodbury, MN (US); John Souter, Longlake, MN (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 0 days.

(21) Appl. No.: 09/185,182

(22) Filed: Nov. 3, 1998

(Under 37 CFR 1.47)

Related U.S. Application Data

(60) Provisional application No. 60/064,110, filed on Nov. 3, 1997.

(51) Int. Cl.⁷ .............................................. G06F 15/00
(52) U.S. Cl. ..................... 358/1.13; 358/1.9; 358/506
(58) Field of Search ................................. 358/1.5, 1.12, 358/1.13, 1.14, 1.15, 506, 1.9; 347/133, 132, 236, 246

(56) References Cited

U.S. PATENT DOCUMENTS

| | | | |
|---|---|---|---|
| 4,816,863 A | 3/1989 | Lee | 355/14 |
| 4,839,722 A * | 6/1989 | Barry et al. | 358/296 |
| 5,457,541 A | 10/1995 | Burns | 358/298 |
| 5,537,516 A * | 7/1996 | Sherman et al. | 358/1.9 |
| 5,664,252 A | 9/1997 | Berg et al. | 396/563 |
| 5,696,604 A | 12/1997 | Curry | 358/459 |
| 5,721,623 A | 2/1998 | Boxma | 358/448 |
| 5,774,639 A | 6/1998 | Schildkraut et al. | 395/115 |
| 5,777,656 A | 7/1998 | Henderson | 347/251 |
| 5,818,960 A * | 10/1998 | Gregory et al. | 382/167 |
| 5,914,744 A * | 6/1999 | Ng | 347/237 |
| 5,933,578 A * | 8/1999 | Van De Capelle | 358/1.9 |
| 5,936,741 A * | 8/1999 | Burns | 358/296 |
| 5,953,498 A * | 9/1999 | Samworth | 358/1.9 |
| 5,956,469 A * | 9/1999 | Liu et al. | 358/1.9 |
| 5,966,159 A * | 10/1999 | Ogasawara | 347/133 |

FOREIGN PATENT DOCUMENTS

| | | |
|---|---|---|
| EP | 0 407 065 | 1/1991 |
| EP | 0 529 530 | 3/1993 |
| EP | 0 629 974 | 12/1994 |

\* cited by examiner

*Primary Examiner*—Mark Wallerson
(74) *Attorney, Agent, or Firm*—Shumaker & Sieffert, P.A.

(57) ABSTRACT

An improved method and apparatus for calibrating an imaging system having multiple imaging outputs such as a plurality of laser diodes. Calibration is achieved by driving each imaging output to form a test pattern on an imaging element, each test pattern having one or more image regions and each image region having a target optical property such as a target optical density. Next, an optical property, such as optical density, is measured for each image region. A response curve is generated for each set of image regions having substantially equal target optical properties. The imaging outputs are adjusted by reducing a difference between the measured optical property and the generated response curve, thereby reducing optical variations between regions that are imaged by the multiple imaging outputs.

26 Claims, 4 Drawing Sheets

METHOD AND DEVICE FOR CALIBRATING AN IMAGING APPARATUS HAVING MULTIPLE IMAGING OUTPUTS

This application claims the benefit of U.S. Provisional Application No. 60/064,110 filed Nov. 3, 1997.

FIELD OF THE INVENTION

This invention relates generally to the field of imaging, and more particularly to a method and device for calibrating an imaging apparatus having multiple imaging outputs.

BACKGROUND OF THE INVENTION

Many existing printing devices are bi-level devices that cannot readily reproduce continuous tone images. In these devices, a continuous tone image is approximated by first defining a halftone grid, known as a screen. The screen is essentially an array of regions known as halftone cells. Each halftone cell typically has a fixed size, and is defined by a matrix of addressable pixels that can be selectively turned "on" in a digital, "bi-level" manner to form various patterns. The human eye integrates the array of halftone cells to form a visual perception of a continuous tone image. A gray value is assigned to each halftone cell within the screen in order to represent the gray value of the corresponding areas of the continuous tone image. By activating a percentage of the pixels contained within each halftone cell, the cell simulates a shade of gray that closely approximates the respective area of the continuous tone image. For example, in order to approximate a lighter area of the image, a smaller percentage of pixels, such as 10%, of the halftone cell will be activated. To simulate a darker image region, a higher percentage of the pixels will be activated.

A conventional printing device produces halftone images by forming halftone dots on a medium at locations corresponding to each pixel that has been turned "on" in the respective halftone cell. The process of forming the halftone dot is particular to the type of printing device. For example, the spots may be formed by depositing ink or toner on a printing substrate at locations corresponding to the activated points. Alternatively, spots may be formed on a photographic film or a thermographic film by exposure to a radiation or thermal energy, respectively. Other printing devices employ processes such as dye sublimation or thermal mass transfer as are known in the art.

Many printing devices reproduce an original color image by separating the image into color components such as yellow, cyan, magenta and black. The color components are independently formed on a respective medium according to the halftone process described above. For example, in offset printing a printing plate is created for each color component and the color image is reproduced by overprinting colored inks.

Dot gain is a well known problem associated with halftone systems and refers to an apparent change in size of a printed halftone dot from its target size. This phenomenon is caused by many factors such as a tendency of ink to spread or variations in film characteristics. For example, when 50% of the dots within a halftone cell are exposed, the resulting dark area may cover more than or less than 50% of the total area defined by the halftone cell. Typically, this is due to nonlinear effects in the imaging system, film, media or processing system. Because 0% and 100% are usually achievable, a non-linear relationship may exist between the target dot area and the resultant dot area.

A subset of conventional printing devices, referred to as imagesetters, consist of a front-end raster image processor (RIP) and a recording device for producing the image on film, paper or a printing plate. Manual calibration techniques are well known in the industry as a means for calibrating a halftone imagesetter so as to compensate for dot gain. Typically an operator of a printing device uses a densitometer to detect dot gain. A densitometer is an instrument that measures the perceived optical density of the reproduced image. A densitometer typically consists of a light emitting component for illuminating the reproduced image and a photodetector for measuring light reflected from the image. Alternatively, the photodetector measures light transmitted through the reproduced image. The darker the image the more light it absorbs and the higher the density reading from the densitometer. During the calibration process a single grayscale test pattern is printed which includes a series of halftone image regions. Each image region has a different predetermined dot area. For example a series of image regions is usually printed such that the dot areas range from 2% to 100%. The operator manually measures the density of each image region with a standard densitometer. From these measurements, a "transfer finction" is created to map any subsequently requested dot area to a dot area which produces the correct visual density.

Conventional calibration methods operate at either the application level or at the RIP level. Application level methods send a transfer function with each print job. On the other hand, RIP-based compensation techniques require the RIP to store transfer functions. The operator selects the correct transfer function based on current operating conditions. If the operating conditions change, such as the use of a new media type, the operator generates a grayscale test pattern, manually measures the densities with a densitometer, generates a transfer ftnction and designates the new function for current use. If no major system change occurs, the functions may be used for an extended period such as several weeks.

The above-described calibration approaches require the operator to determine when calibration is appropriate and therefore require substantial operator interaction. Additionally, such manual approaches are inadequate in imaging systems having multiple imaging outputs such as several laser diodes. Manual calibration of such systems is too time consuming and yield results that are only marginally acceptable.

For the reasons stated above, and for other reasons stated below which will become apparent to those skilled in the art upon reading and understanding the present specification, there is a need in the art for a method and device for calibrating an imaging system having multiple imaging outputs without requiring operator intervention.

SUMMARY OF THE INVENTION

To overcome the problems in the prior art, the present invention provides an improved method and device for calibrating an imaging apparatus that has multiple imaging outputs such as a plurality of laser diodes. Calibration is achieved by driving each imaging output to form a test pattern having at least one image region on an imaging element. Each image region has a target optical property such as a target optical density, a target sharpness, etc. Next, an optical property, such as optical density, is measured for each formed image region. The imaging outputs are adjusted as a function of the measured optical properties, thereby reducing optical variations between the regions that are imaged by the multiple imaging outputs.

More specifically, the imaging outputs are adjusted by characterizing the measured optical property as a function of one or more imaging variables. A response curve is generated for each set of image regions that have substantially equal target optical properties. For example, if each imaging output forms a grayscale, a response curve is generated for the image regions having substantially equal target densities. The imaging variables for each imaging region are adjusted by reducing a difference between the measured optical property and the response curve. For example, in one embodiment the imaging outputs are a plurality of pulsed laser diodes such that the adjusted imaging variables include a pulse duration and a laser current. These and other features and advantages of the invention will become apparent from the following description of the preferred embodiments of the invention.

DETAILED DESCRIPTION OF THE INVENTION

In the following detailed description, references are made to the accompanying drawings that illustrate specific embodiments in which the invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1:
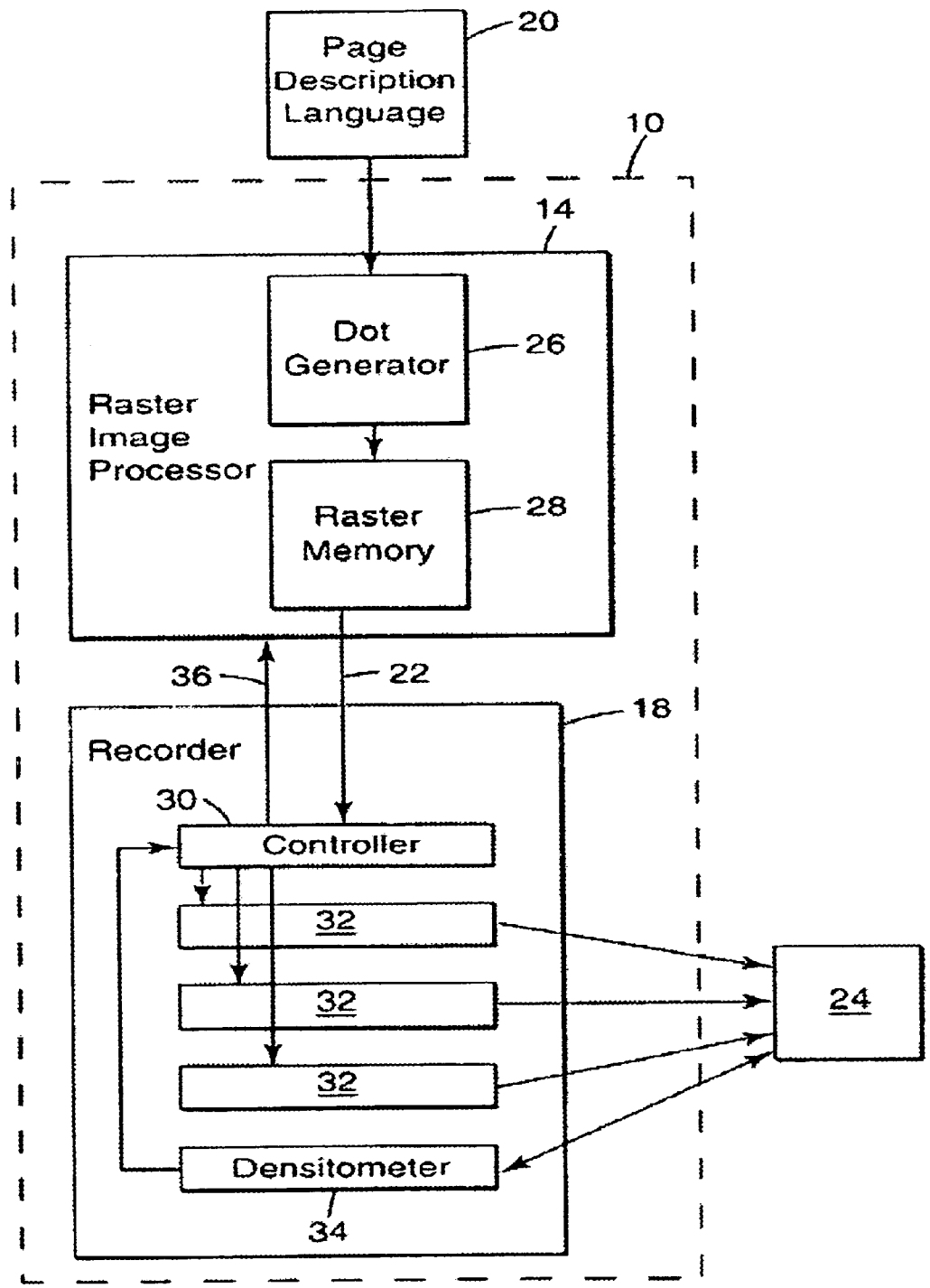
FIG. 1 is a block diagram of an imaging apparatus that has multiple imaging outputs and includes a calibration device in accordance with the present invention.

Referring to the drawings, FIG. 1 illustrates an imaging apparatus 10 in block diagram form. Imaging apparatus 10 represents any imaging device having multiple imaging sources 32. For example, in one embodiment, as illustrated in FIG. 1, imaging apparatus 10 is any half-tone imaging device. In another embodiment, however, imaging apparatus 10 may be any continuous tone imaging device or any imaging device using a combination of these imaging processes.

Imaging apparatus 10 includes raster image processor (RIP) 14 and recorder 18. RIP 14 receives file 20 that contains image data characterized in a page description language (PDL) such as Postscript™. As one example, RIP 14 receives PDL file 20 directly from a workstation (not shown) in the form of a data file. In another example, RIP 14 is connected to a network and receives PDL file 20 from one of a plurality of workstations (also not shown). Additionally, RIP 14 may include a local media reader for loading PDL file 20 from a removable media.

Upon receiving PDL file 20, RIP 14 converts the image data contained within PDL file 20 into raster data 22 that is communicated to recorder 18. Recorder 18 forms a halftone image on imaging element 24. As one example, imaging element 24 may be photographic such that recorder 18 includes a processor station (not shown) for chemical processing and developing the halftone image formed on imaging element 24. In another example, imaging element 24 may be photothermographic and can be thermally processed. Other imaging processes are also suitable for the present invention including direct thermal imaging, ablation imaging, dye transfer, electrophotographic, electrographic, ink jet, dye sublimation and thermal mass transfer.

As a half-tone imaging device, RIP 14 includes dot generator 26 and raster memory 28. Dot generator 26 receives PDL file 20 and generates a series of halftone dots. The halftone dots are proportional in size to gray values of an image represented by PDL file 20 and are stored in raster memory 28 as raster data. Controller 30 commands recorder 18 such that imaging outputs 32 produce a latent halftone image on imaging element 24. For example, in one embodiment imaging outputs 32 are a plurality of laser diodes. In this configuration, as imaging element 24 is fed through recorder 18, each laser diode images a corresponding portion of imaging element 24.

Controller 30 represents a logic circuit suitable for device control. For example, controller 30 may be an embedded microprocessor having RAM, for data manipulation and general program execution, and ROM or flash memory for program storage. Alternatively, controller 30 can be isolated from the imaging device with the calculated adjustments to the imaging variables being carried out manually. Furthermore, imaging outputs 32 may comprise a laser diode scan module for emitting a suitable beam of radiation.

As described in detail below, imaging apparatus 10 engages in an inventive process for calibrating imaging apparatus 10 in order to reduce imaging variations between imaging outputs 32. Imaging apparatus 10 invokes the calibration process either when manually initiated by an operator or when a drift in system performance is automatically detected. Generally speaking, the calibration process can be grouped into three phases: (1) characterization, (2) balancing, and (3) monitoring.

Figure 2:
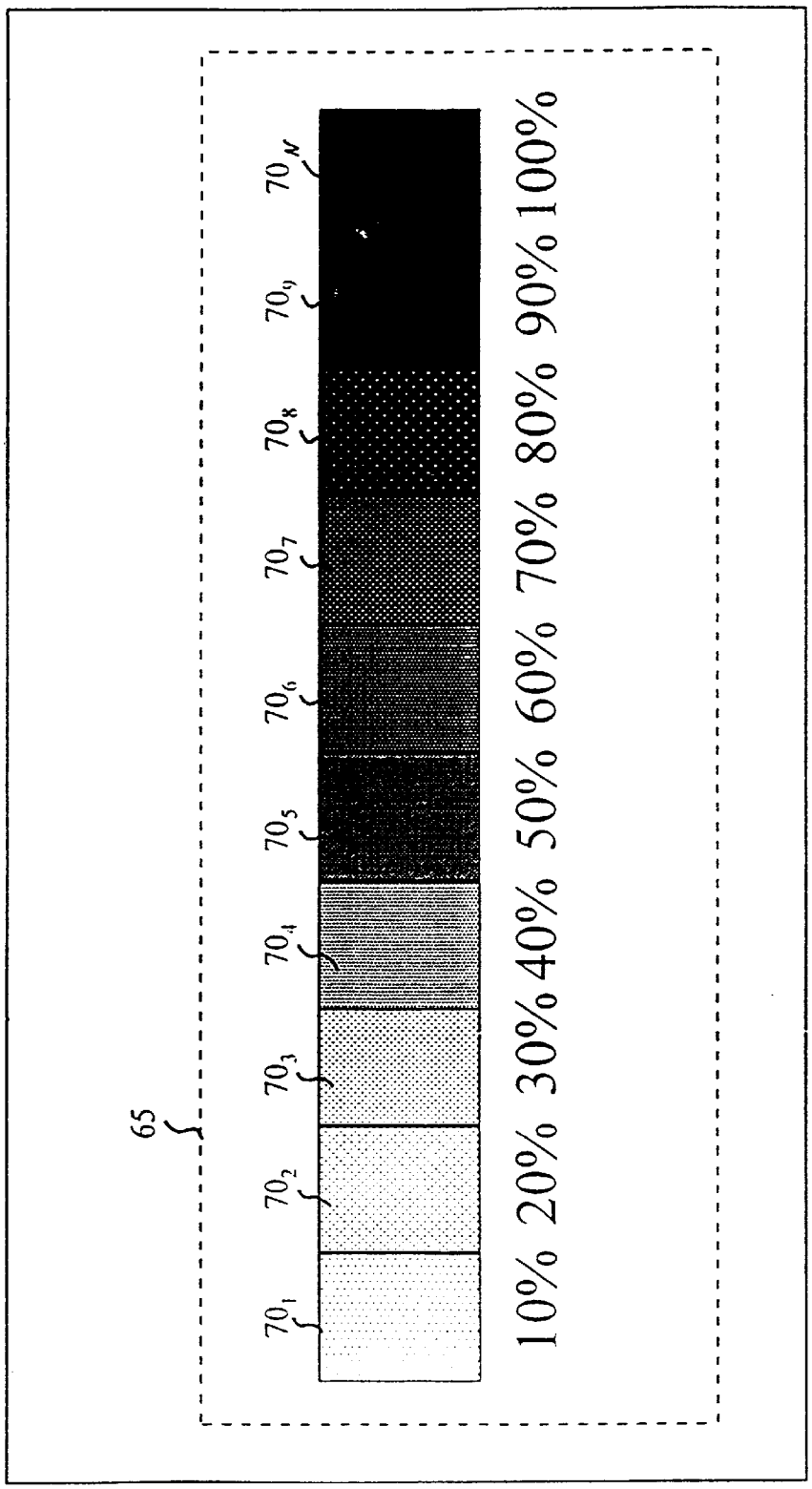
FIG. 2 is an example of a test pattern suitable for use by the present invention in calibrating an imaging apparatus.

During the characterization phase, recorder 18 forms a plurality of test patterns on imaging element 24. FIG. 2 illustrates one test pattern 65 that may be used during the characterization phase. Each test pattern 65 includes image regions $70_1$ through $70_N$. Each image region 70 of test pattern 65 has a different target dot area. For example, the corresponding dot areas may range from 10% to 100%, alternatively, the dot areas may range from 5% to 95%.

Controller 30 of recorder 18 commands each imaging output 32 to form a corresponding test pattern 65. When forming each test pattern 65, controller 30 drives imaging outputs 32 based on initial settings for a variety of imaging variables. For example, in one embodiment, each imaging output 32 is a pulsed laser diode. In this embodiment, controller 30 drives imaging outputs 32 as a function of initial settings for laser current and pulse duration.

After each imaging output 32 of recorder 18 forms a corresponding test pattern 65, recorder 18 measures an optical property of each image region 70. For example, in one embodiment, densitometer 34 measures an optical density of each image region 70 as imaging element 24 exits recorder 18. Alternatively, a wavelength scanning device such as a spectrophotometer may be used to measure and calibrate one or more colorimetric properties such as those defined within the CIELUV or CIELAB systems. Additionally, emissive properties such as fluorescence intensity may be measured with a suitable device and used as a calibration property in this invention. Other optical properties such as sharpness may also be used to calibrate imaging variables such as focal distance.

In order to measure the optical density of each image region 70, a light emitting component (not shown) of densitometer 34 illuminates each image region 70 as imaging element 24 passes within proximity of densitometer 34. Alternatively, densitometer 34 may be translated within proximity of imaging element 24. Densitometer 34 also includes a photodetector (also not shown) for measuring the light reflected from each image region 70 of each test pattern 65. Alternatively, densitometer 34 may measure light transmitted through each image region 60. In either case, recorder 18 should be suitably sealed to prevent external light from causing spurious measurement errors. It is also contemplated that a user may manually measure the densities of each image region 60 with a portable densitometer coupled to controller 30 via an external input/output port.

For each image region 70 of each test pattern 65, densitometer 34 converts the density readings to digital representation and communicates them to controller 30. Based on the measured optical property, controller 30 calculates a set of characterization parameters for each image region 70 of each test pattern 65. More specifically, controller 30 calculates characterization parameters of a suitable mathematical function that characterizes the measured optical property in terms of the imaging variables. A general linear expression for characterizing reflection optical density is as follows:

$$ROD = a + b*v_1 + c*v_2 + d*v_3 \ldots$$

where ROD is the optical density and a, b, c and d are parameters (coefficients) for imaging variables $v_1$, $v_2$ and $v_3$. Alternatively, non-linear mathematical expressions may be used such as polynomials of degree two or higher, trigonometric, logarithmic, exponential functions, etc.

Preferably, the imaging variables described by the mathematical function are readily controllable. For example, if imaging outputs 32 are pulsed laser diodes then a suitable linear function for characterizing an optical density measurement is:

$$ROD = a + b*\text{laser current} + c*\text{pulse width}$$

where ROD is a reflected optical density measurement, a, b and c are coefficients and the imaging variables laser current and pulse width are controllable imaging variables.

During the characterization phase of the calibration, imaging apparatus 10 calculates the characterization parameters for each image region 70 of each test pattern 65. Thus, if imaging apparatus 10 has forty imaging outputs 32 and test pattern 65 has ten image regions 70, controller 30 calculates four hundred (40*10) sets of characterization parameters.

The characterization phase described above results in a set of characteristic equations, one equation for each imaging region 70 formed by imaging outputs 32. Once the characterization parameters have been calculated, imaging apparatus 10 enters the balancing phase. The balancing phase attempt to reduce imaging variations between image regions 70 formed by adjacent imaging outputs 32.

In this phase, controller 30 calculates a set of response curves. More specifically, controller 30 fits a response curve to the set of measured optical densities for imaging regions 70 that have similar target densities. Thus, if each test pattern 65 has N image regions 70, controller 70 generates N response curves. A smooth curve is fitted to each set of target densities such as 10%, 15%, etc. Suitable smoothing routines include three-point and five-point moving averages, polynomial functions, spline functions, etc.

Figure 3:
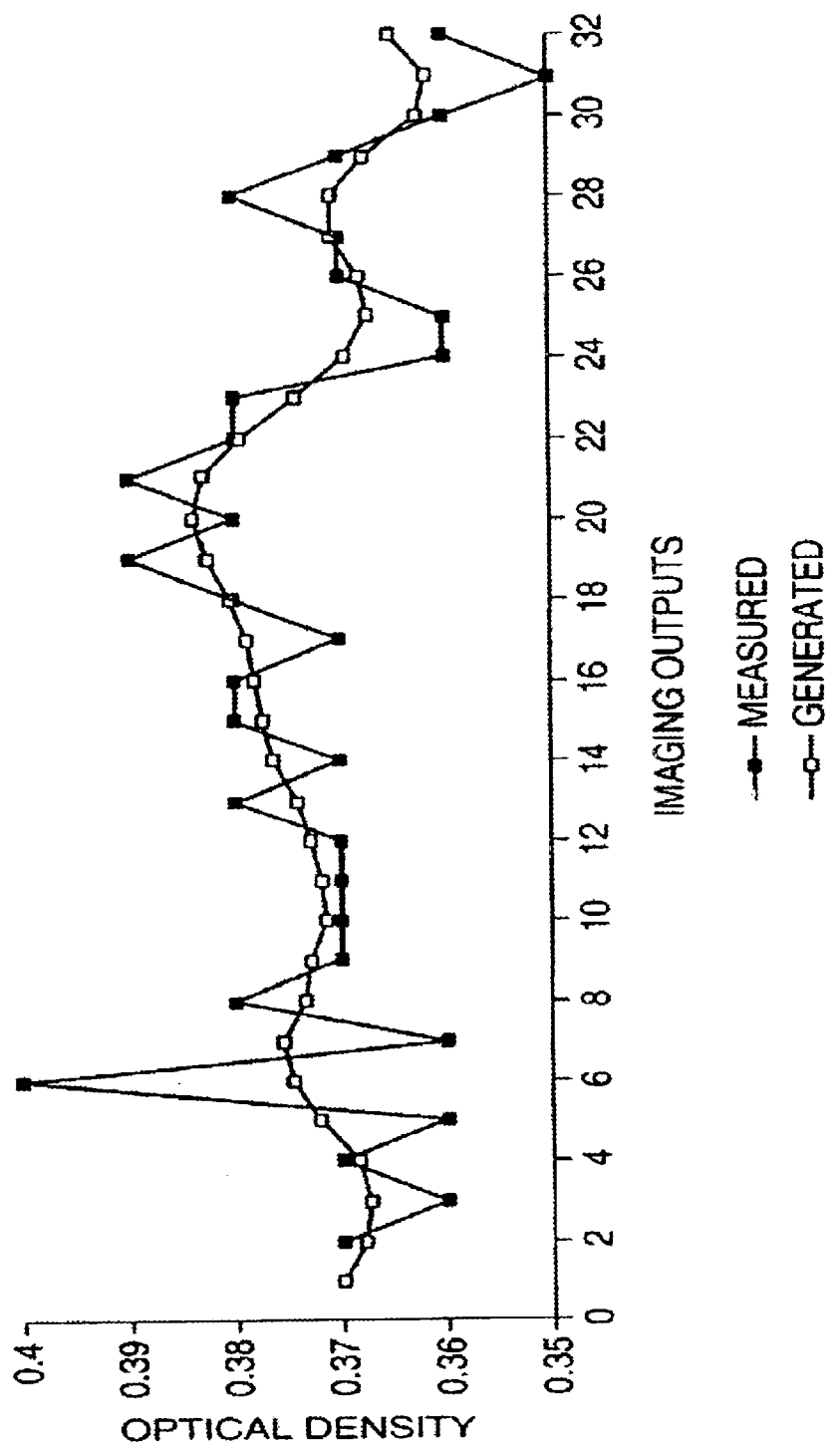
FIG. 3 is an example of a response curve that was generated by the inventive calibration technique to reduce imaging variations between imaging outputs at a particular optical density.

After generating the set of response curves, controller 30 calculates a difference between the measured optical density at each image region 70 and a corresponding point along the generated response curve. For example, FIG. 3 illustrates a response curve 80 that was generated to fit the measured densities of a set of image regions 70 for an imaging apparatus having thirty-two imaging outputs. For each imaging output 32, controller 30 calculates a difference between the measured density (indicated in black) and the corresponding point (indicated in black) along response curve 80. For example, for the sixth imaging output of FIG. 3, the measured density is 0.4 while the corresponding point along generated response curve is 0.375, yielding a difference of 0.025.

Based on the calculated differences for each imaging output 32, controller 30 adjusts one or more of the imaging variables of the characteristic equation corresponding to the particular imaging output 32 and the particular imaging region 70. More specifically, controller 30 iteratively modifies the imaging variables of the corresponding characteristic equation until the characterized optical property, such as optical density (OD), approaches the response curve. This process is repeated for each characteristic equation generated during the characterization phase. In this manner, controller 30 reduces sharp variations between proximate imaging outputs 32.

One advantage of the above discussed calibration technique is that recorder 18 is capable of performing the calibration process without requiring operator intervention such as manually measuring of the densities. It is also contemplated that the calibration process can be repeated for different media types. In this manner, recorder 18 maintains calibrated imaging variables for a wide variety of media types.

In one embodiment, controller 30 generates a lookup table as a mechanism for storing the adjusted imaging variables. By driving imaging outputs 32 according to the calibrated imaging variables stored in the lookup table, recorder 18 reduces deviation between actual density and target density along the response curves. Furthermore, the above described calibration process reduces variations between adjacent imaging outputs 32, thereby eliminating sharp deviations in imaging quality.

Referring to FIG. 1, once calibration is achieved, recorder 18 maps raster data 22 to appropriate drive values for imaging outputs 32 based on the adjusted imaging variables generated and stored during the calibration process. Thus, in this exemplary embodiment, RIP 14 is not involved in this calibration process. In another embodiment, RIP 14 receives calibration data from recorder 18 via communication line 36 and applies the calibration data to the image data of PDL file 20.

Figure 4:
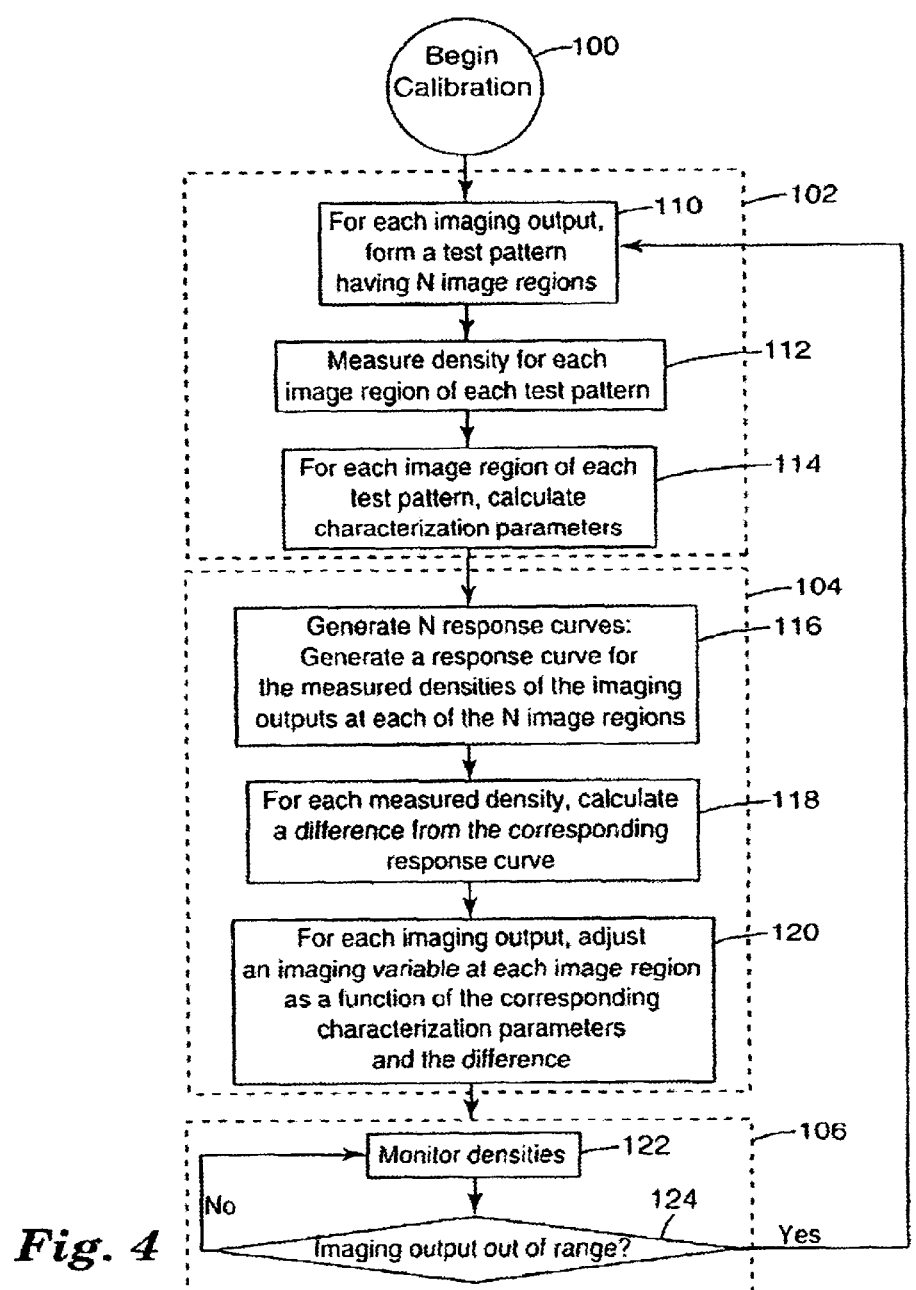
FIG. 4 is flow chart illustrating one mode of operation of an imaging apparatus performing the inventive calibration method.

FIG. 4 is a flow chart that illustrates one mode of operation of imaging apparatus 10 during the inventive calibration process. Characterization phase 102 includes the logical steps 110, 112 and 114 while balancing phase 104 includes the logical steps 116, 118 and 120. Finally, monitoring phase 106 includes steps 122 and 124.

Controller 30 of imaging apparatus 10 begins the inventive calibration process at starting step 100 and immediately proceeds to step 110. In step 110, controller 30 commands each imaging output 32 to completely form a corresponding test pattern 65 of FIG. 2 including each image regions $70_1$ through $70_N$. Each image region 70 of test pattern 65 has a different dot area as described above. For example, the corresponding dot areas range from 10% to 100% in the embodiment illustrated in FIG. 2.

Once the plurality of test patterns 65 are formed on imaging element 24, controller 30 proceeds to step 112 and receives optical density readings from densitometer 34 for each image region 70 of each test pattern 65. Other optical properties such as calorimetric characteristics as defined in the CIELAB or CIELUV systems, sharpness, fluorescence emission, etc., are also suitable optical properties that may be used instead of optical density measurements.

In step 114, controller 30 calculates a set of characterization parameters for each image region 70 of each test pattern 65 based on the received optical density readings. As described above, controller 30 calculates one or more parameters of a suitable mathematical function in order to characterize the measured optical density in terms of the imaging variables.

After controller 30 of imaging apparatus 10 calculates the characterization parameters for image region 70 of each test pattern 65, controller 30 exits the characterization phase 102 and proceeds to step 116 of balancing phase 104 in order to reduce imaging variations between adjacent imaging outputs 32.

In step 116, controller 30 calculates a plurality of response curves, a response curve for each set of imaging region 70 that have substantially equal target optical densities. In other words, controller 70 fits a smooth curve to each set of densities measured for each image region 70. In one embodiment, the generated response curves are stored in memory for future monitoring of imaging outputs 32.

Controller 30 proceeds to step 118 and, for each image region 70 formed by each imaging output 32, calculates a difference between the measured density and a corresponding point along the corresponding generated response curve. Step 120 is the final step of balancing phase 104. In this step, controller 30 reduces the difference between the characterized optical density and the target point along the response curve by adjusting one or more of the imaging variables of the characteristic equation that corresponds to the particular imaging output 32 and the particular imaging region 70. In this manner, balancing phase 104 reduces sharp variations between proximate imaging outputs 32.

Upon calibrating imaging apparatus 10, controller proceeds from step 120 to step 122 of monitoring phase 106. In step 122, controller 30 monitors imaging outputs 32 by periodically commanding each imaging output 32 to form a corresponding test pattern 65 and comparing each measured density with the stored response curve. In step 124 controller 30 determines whether one of the measured densities deviates from the response curve by more than a predetermined threshold such as 0.03 deviation in the measured reflection optical density of a solid density area of the image. If so, controller 30 jumps to step 110 and repeats characterization phase 102 and balancing phase 104. If not, controller returns to step 122 and continues to monitor imaging outputs 32.

Various embodiments have been described of a method and device for calibrating an imaging apparatus having multiple imaging outputs. The present invention may readily be used in conjunction with half-tone imaging devices as well as continuous-tone imaging devices. Furthermore, the invention is applicable to any suitable imaging process including photographic, photothermographic, electrophotographic, electrographic, direct thermal imaging, ablation imaging, dye transfer, ink jet, dye sublimation and thermal mass transfer. Accordingly, this application is intended to cover any adaptations or variations of the present invention. It is manifestly intended that this invention be limited only by the claims and equivalents thereof.

We claim:

1. A method for calibrating an imaging system comprising:
    forming a plurality of image regions on an imaging element with each of a plurality of adjacent imaging outputs of the imaging system, wherein each imaging region has a target optical property;
    measuring an optical property for each image region;
    defining a characterization equation for each measured optical property as a function of one or more imaging variables and one or more characterization parameters;
    calculating the characterization parameters for each characterization equation;
    generating a response curve for image regions having substantially equal target optical properties and formed by different imaging outputs;
    adjusting at least one of the imaging variables as a finction of corresponding measured optical property and the corresponding response curve to reduce variations between the adjacent imaging outputs; and
    forming subsequent images as a finction of the adjusted imaging variables and the calculated characterization parameters.

2. The method of claim 1, wherein the imaging outputs are a plurality of adjacent pulsed laser diodes and adjusting at least one of the imaging variable includes adjusting a pulse duration and a laser current.

3. The method of claim 1, wherein adjusting at least one of the imaging variable includes calculating a difference between the measured optical property for the respective image regions formed by each of the outputs and the response curve.

4. The method of claim 1, further including repeating the measuring step in order to monitor each imaging output.

5. The method of claim 1, wherein the step of measuring an optical property for each image region comprises the step of automatically measuring an optical density of each image region using a densitometer communicatively coupled to the imaging system.

6. The method of claim 1, wherein the step of measuring an optical property for each image region comprises the step of automatically measuring the optical density of each image region using a spectrophotometer communicatively coupled to the imaging system.

7. The method of claim 1, wherein measuring the optical property includes measuring a light emissive property.

8. The method of claim 7, wherein the light emissive property is fluorescence intensity.

9. The method of claim 1, wherein measuring the optical property includes measuring one or more colorimetric characteristics defined within the CIELUV or CIELAB systems.

10. The method of claim 1, wherein generating the response curve includes storing the response curve in memory.

11. The method of claim 10, further including repeating the step of adjusting one of the imaging variables when one or more of the corresponding measured optical properties deviates from the stored response curve by more than a predetermined threshold.

12. An imaging apparatus for forming a calibrated output image on an imaging element according to a page description language, the imaging system comprising:
    a raster image processor (RIP) for receiving image data characterized by a page description language and generating raster data based on the image data; and
    a recorder receiving the raster data generated by the RIP, the recorder comprising:

a plurality of adjacent imaging outputs, each imaging output imaging a corresponding region of an imaging element;

an input for measuring an optical property of the imaging element and a controller coupled to the imaging outputs and the input, wherein the controller commands each imaging output to form at least one corresponding image region on the imaging element, and further wherein the controller commands the input to measure an optical property for each of the formed image regions, wherein the controller adjust at least one of the imaging outputs as a function of the measured optical properties for the image regions formed by the other imaging outputs to reduce variations between the adjacent imaging outputs.

13. The imaging apparatus of claim 12, wherein the input measures a light emissive property.

14. The imaging apparatus of claim 13, wherein the light emissive property is fluorescence intensity.

15. The imaging apparatus of claim 12, wherein the input measures optical density.

16. The imaging apparatus of claim 12, wherein the input measures one or more calorimetric characteristics defined within the CIELUV or CIELAB systems.

17. The imaging apparatus of claim 12, wherein the controller adjusts the imaging output by characterizing a target optical property of each image region as a function of one or more imaging variables and adjusting at least one of the imaging variables as a function of a corresponding measured optical property.

18. The imaging apparatus of claim 17, wherein the imaging outputs are a plurality of pulsed laser diodes, and further wherein the imaging variables adjusted by the controller include a pulse duration and a laser current.

19. The imaging apparatus of claim 12, wherein each image region has a target optical property and the controller adjusts at least one imaging output by generating a response curve for image regions having substantially equal target optical properties, and further wherein the controller adjusts the imaging variables by calculating a difference between the measured optical properties and the response curve.

20. A method for calibrating an imaging system having M adjacent outputs, each output imaging a corresponding portion of an imaging element, the method comprising:

forming M test patterns on the imaging element with the M outputs, wherein each test pattern has N image regions formed by a different one of the imaging outputs of the imaging system;

measuring an optical property for each of the N image regions of the M test patterns;

generating N response curves as a function of the image regions that have substantially equal measured optical properties and are formed by different outputs; and adjusting at least one of the outputs as a function of the generated response curves to reduce variations between the adjacent imaging outputs.

21. The method of claim 20, wherein the adjusting step includes:

calculating M*N characterization equations, each characterization equation including one or more imaging variables and one or more characterization parameters; and adjusting at least one of the imaging variables as a function of the measured optical properties and the generated response curves.

22. The method of claim 20, wherein measuring the optical property includes measuring a light emissive property.

23. The method of claim 22, wherein the light emissive property is fluorescence intensity.

24. The method of claim 20, wherein measuring the optical property includes measuring an optical density.

25. The method of claim 20, wherein measuring the optical property includes measuring one or more colorimetric characteristics defined within the CIELUV or CIELAB color space coordinate systems.

26. The method of claim 20, wherein die outputs comprise a plurality of pulsed laser diodes, and wherein adjusting at least one of the outputs comprises adjusting a pulse duration and a current of at least one of the pulsed laser diodes.

* * * * *